April 1, 1930. W. E. C. STONE 1,752,861
DIRIGIBLE HEADLIGHT
Filed April 11, 1928
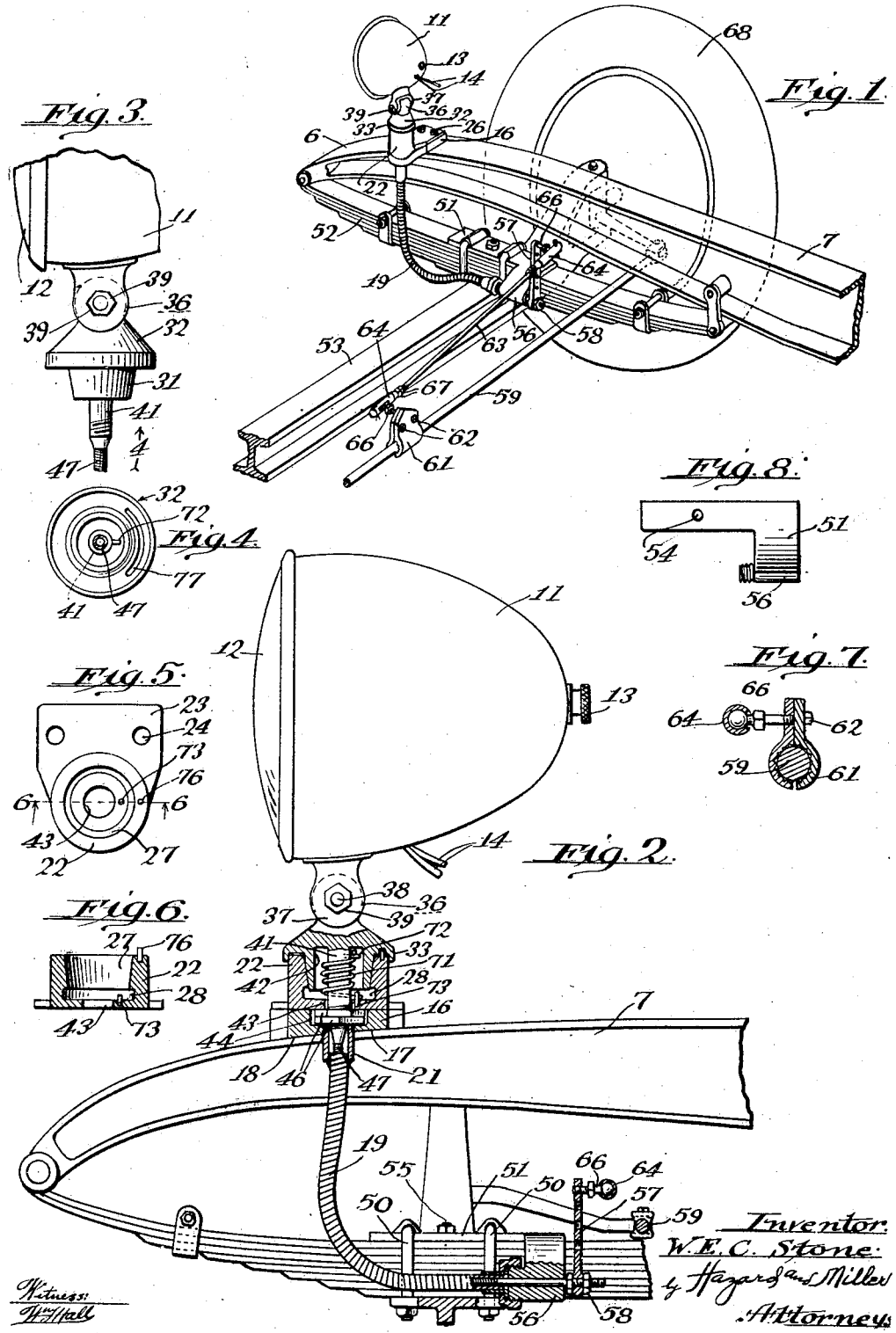

Patented Apr. 1, 1930

1,752,861

UNITED STATES PATENT OFFICE

WALLACE E. C. STONE, OF LOS ANGELES, CALIFORNIA

DIRIGIBLE HEADLIGHT

Application filed April 11, 1928. Serial No. 269,268.

This invention relates to dirigible headlights for vehicles, and has for an object the provision of a dirigible headlight having an improved means for mounting the headlight upon the vehicle.

A more detailed object is the provision of a dirigible headlight adapted to be mounted upon the vehicle by means of a tapered plug and socket connection adapted to permit movement of the headlight about a vertical axis, and also adapted to minimize vibration of the headlight in respect to the vehicle.

A further object is the provision of a headlight mounting of the character indicated, capable of adjustment, to take up any play which might develop through long usage.

A further object is the provision of a dirigible headlight having positive means for being connected to the tie rod of the vehicle in such a manner that when the front wheels of the vehicle are turned to either side, the headlight also is turned to the same side to illuminate that portion of the roadway into which the vehicle is directed.

With the foregoing and other objects in view which will be made manifest in the following detailed description and specifically pointed out in the appended claims, reference is had to the accompanying drawings for an illustrative embodiment of the invention, wherein:

Figure 1 is a fragmentary perspective view showing the headlight in applied position upon the frame of a vehicle, and operatively connected to the tie rod thereof.

Fig. 2 is a side elevation of the headlight with parts of the operating mechanism in vertical section.

Fig. 3 is a side elevation of a portion of the headlight, and the plug portion of the mounting therefor.

Fig. 4 is a plan view taken in the direction of the arrow 4 of Fig. 3.

Fig. 5 is a top plan view of the socket portion of the mounting.

Fig. 6 is a vertical sectional view taken upon the line 6—6 of Fig. 5.

Fig. 7 is a vertical sectional view taken through the tie rod and clamp.

Fig. 8 is a top plan view of the bracket for securing the flexible conduit to the spring of the vehicle.

Broadly considered, the headlight of the present invention comprises a housing with suitable light source therein, and adapted to be mounted upon a vehicle by means of my improved dirigible headlight support which is adapted to not only so support the headlight that adjustment about a horizontal axis is possible, and that movement about a vertical axis is automatically effected through a connection to the tie rod of the vehicle, but which is also capable of so supporting the headlight that practically all vibration thereof in respect to the vehicle, is eliminated. It is also possible to adjust the mounting whenever desirable, to take up any wear which may have developed.

In greater detail, the headlight of the present invention is shown mounted upon the forward end 6 of one of the side members 7 of the frame of an automobile. The headlight proper, consists of a housing 11, within which a lens 12, reflector (not shown) and light source (not shown) are mounted in the conventional manner. A knurled screw 13 provides ready means for adjusting the focus of the headlight; and the light source is supplied with energy through electrical conductors 14.

The means for mounting the housing 11 upon the vehicle, include an anchor block 16 adapted to be secured to the forward curved end or "horn" 6 of one of the side members 7 of the frame of the vehicle. For this purpose the under side 17 of the anchor block 16, is curved downwards toward its front edge 18, as clearly shown in Fig. 2. The curvature of the under side 17, coincides with that of the horn 6 to which the anchor block 16 is to be secured. The anchor block 16 is of sufficient width so that one of its side edges extends inwards past the side of the horn 6 so that a flexible conduit 19 may be rigidly secured to the under side 17 of the anchor block 16 by threading a sleeve 21, which is secured to the upper end of the conduit, into an aperture in the block at one side of the horn 6.

A socket member 22 is adapted to be rigidly secured to the top of the anchor block 16, a flange 23 extending to one side thereof with apertures 24 therethrough through which fastening bolts 26 may extend, to rigidly secure the socket member 22 in place. If desirable, the bolts 26 may be of sufficient length to extend clear through both the flange 23 and anchor block 16, to be threaded into the horn 6 so as to lock both elements of the mounting securely to the frame of the vehicle. The bore 27 of the socket member 22 is tapered with its smaller end at the bottom, as clearly shown in Fig. 6; and the lower end of the bore 27 is relieved to provide a chamber 28.

A plug member 31 is receivable within the bore 27 of the socket member 22, the plug portion of the plug member 31 being tapered complementarily to the tapered bore 27, so that a nice fit between the two is obtained. The length of the plug 31 however, is such that it terminates above the bottom of the bore 27, permitting the distance that the plug 31 is receivable within the bore 27, to be governed by the taper itself. The upper portion of the plug member 31 is enlarged to provide a flange 32 extending over the top of the socket member 22, and spaced therefrom. An annular flange 33 depends from the periphery of the top flange 32 about the socket member, to exclude water and dirt from the bore. A head 36 is provided in the form of a cylinder integral at one side with the upper portion of the plug member 31; and a pair of ears 37 extend downwards from the housing 11, one at each end of the cylinder 36. A bolt 38 extends axially through the ears 37 and cylinder 36, so that by tightening a nut 39 threaded upon the bolt 38, the ears 37 may be pressed tightly against the ends of the cylinder 36 to clamp the headlight in position after it has been adjusted about a horizontal axis.

A pin 41, preferably integral with the plug member 31, is disposed centrally within an axial bore 42 in the plug member, and extends vertically downwards through an aperture 43 in the bottom of the socket member 22 and into the aperture in the anchor block 16, which is enlarged as at 44 to receive lock nuts 46 which are threaded upon the lower end of the pin 41 to retain the plug member 31 within the socket member 22. A flexible cable 47 extends through the conduit 19 to be secured at one end to the pin 41.

The other end of the flexible conduit 19 is rigidly secured to a bracket 51 adapted to be inserted between the spring 52 of the vehicle and the shackle bolts 50 which retain the spring upon the axle 53. An aperture 54, through an end of the bracket 51, which is preferably L-shaped, is adapted to receive the bolt 55 which extends through the spring leaves. The bracket 51 is provided with a journal 56 for the other end of the cable 47 which extends through the journal 56 to have a crank 57 secured thereto by jam nuts 58.

It is to be understood that the length of the bracket 51 is such that when secured to the vehicle as described, the crank 57 will be positioned closely adjacent the tie rod 59 of the vehicle. A clamp 61 is adapted to be secured to the tie rod 59 and made rigid therewith by tightening its bolts 62. The clamp 61 is connected to the crank 57 by means of a link 63 which is adjustable as to length, by threading the ends of the tie rod in the housings 64 for the ball and socket joints 66, by means of which the link 63 is connected at its ends, to the crank 57 and clamp 61 for universal movement. Jam nuts 67 upon the link 63, may be tightened against the housings 64 after the required adjustment as to length has been effected.

The manner of operating my improved dirigible headlight is believed to be obvious from the above description of its component parts. It is to be understood that when the vehicle is turned to either side, the front wheels 68 are retained in substantial parallel alignment by the tie rod 59, which must necessarily, therefore, move transversely of the vehicle at such time.

When the tie rod 59 moves in this manner, it carries with it the clamp 61; and through the connection of the crank 57 thereto, the cable 47 is twisted within the flexible conduit 19 to impart rotary movement about a vertical axis, to the pin 41 in a direction similar to that in which the front wheels 68 are turned, and with it, the plug member 31 and housing 11. In order to keep the cable 47 under a certain degree of torsional tension at all times, a spring 71 is coiled about the pin 41 within the axial bore 42 of the plug member 31. This spring 71 is under tension between a finger 72 rigid with the pin 41, and a finger 73 rigid with the bottom of the socket member 22. It is to be understood of course, that the spring 71 is so tensioned that a constant torsional stress will be imposed upon the cable 47 so that movement of the housing 11 through the action of the spring 71, will be prevented by the engagement of the other end of the cable 47 with the tie rod 59.

Means are also provided for limiting the amount of movement of the plug member 31 in respect to the socket member 22, comprising a pin 76 rigid with the socket member 22 in register with an arcuate slot 77 in the under side of the flange 32. The length of the slot 77 is such that the pin 76 will engage one end thereof when the housing 11 has been turned to the limit of its movement.

Thus it may be seen that the housing 11 may be turned about a vertical axis automatically when the front wheels 68 are turned to change the course of travel of the vehicle.

This of course, will serve to illuminate that portion of the roadway into which the vehicle is directed. Horizontal adjustment of the headlight may be effected by loosening the nut 39 upon the bolt 38, and moving the housing 11 in respect to the plug member 31, about a horizontal axis.

Various changes in the details of construction may be made without departing from the spirit and scope of the invention as defined by the appended claims.

I claim:

1. A headlight mounting comprising a socket member securable to a vehicle, a tapered plug member having an axial bore extending upwards from the bottom thereof, said plug member fitting within said socket member for rotary movement in respect thereto, a pin rigid with said plug and extending axially from the bore thereof through an aperture in the bottom of said socket member, a spring interposed between said plug member and socket member and disposed within the bore of the plug member, means for imparting rotary movement to said pin, and means for attaching a headlight to said plug member.

2. A headlight mounting comprising a socket member securable to a vehicle, a tapered plug member having an axial bore extending upwards from the bottom thereof, said plug member fitting within said socket member for rotary movement in respect thereto, a pin rigid with said plug member and extending axially from the bore thereof through an aperture in the bottom of said socket member, a nut threaded upon said pin below the bottom of said socket member to limit upward movement of the plug member in respect to the socket member, a spring interposed between said plug and socket members and disposed within the bore of the plug member, means for imparting rotary movement to said pin, and means for attaching a headlight to said plug member.

3. A headlight mounting comprising a socket member securable to a vehicle, a tapered plug member having an axial bore extending upwards from the bottom thereof, said plug member fitting within said socket member for rotary movement in respect thereto, a flange extending from said plug member over said socket member, and an annular flange depending therefrom and encircling the upper portion of said socket member, a pin rigid with said plug member and extending axially from the bore thereof through an aperture in the bottom of said socket member, a spring interposed between said plug and socket members and disposed within the bore of the plug member, means for imparting rotary movement to said pin, and means for attaching a headlight to said plug member.

4. A headlight mounting comprising a socket member securable to a vehicle, a tapered plug member fitting within said socket member for rotary movement in respect thereto, a flange extending from said plug member over said socket member, and an annular flange depending therefrom and encircling the upper portion of said socket member, a pin rigid with said plug member and extending axially from the bore thereof through an aperture in the bottom of said socket member, a nut threaded upon said pin below the bottom of said socket member to limit upward movement of the plug member in respect to the socket member, an anchor block rigid with said socket member and having a recess therein for the reception of said nut, and a hole therethrough, a conduit threaded into said hole, and a cable extending through said conduit and secured to said pin to impart rotary movement to the plug member when the cable is turned within the conduit.

5. A headlight mounting comprising a socket member securable to a vehicle, a tapered plug member having an axial bore extending upwards from the bottom thereof, said plug member fitting within said socket member for rotary movement in respect thereto, and said plug member terminating above the bottom of the bore of said socket member, a flange extending from said plug member over and spaced from said socket member, and an annular flange depending therefrom and encircling the upper portion of said socket member, a pin rigid with said plug member and extending axially from the bore thereof through an aperture in the bottom of said socket member, a spring interposed between said plug and socket members and disposed within the bore of the plug member, means for imparting rotary movement to said pin, and means for attaching a headlight to said plug member.

6. A dirigible headlight operating mechanism for a vehicle, wherein wheels are maintained in alignment by a tie rod, comprising means for mounting a headlight on the vehicle for rotary movement, a conduit leading from said mounting means to a point adjacent said tie rod, a cable extending through said conduit and operatively connected at one end to said headlight, a crank rigid with the other end of said cable, and a link pivoted at one end to said crank and at the other end to said tie rod.

7. A dirigible headlight operating mechanism for a vehicle wherein wheels are maintained in alignment by a tie rod, comprising means for mounting a headlight on the vehicle for rotary movement, a clamp securable to said vehicle adjacent said tie rod, a conduit secured at one end to said mounting means and at the other end to said clamp, a cable extending through said conduit and clamp and operatively connected at one end to said headlight, a crank rigid with the other end of said cable closely adjacent said clamp, and a link pivoted at one end to said crank and at the other end to said tie rod.

8. A dirigible headlight operating mechanism for a vehicle wherein wheels are maintained in alignment by a tie rod, comprising means for mounting a headlight on the vehicle for rotary movement, a conduit leading from said mounting means to a point adjacent said tie rod, a cable extending through said conduit and operatively connected at one end to said headlight, a crank rigid with the other end of said cable, and a link pivoted for universal movement at one end to said crank and at the other end to said tie rod.

In testimony whereof I have signed my name to this specification.

WALLACE E. C. STONE.